(12) United States Patent
Wechsler

(10) Patent No.: US 10,625,662 B1
(45) Date of Patent: Apr. 21, 2020

(54) AUTOMOTIVE HAZARD LIGHT SYSTEM

(71) Applicant: Paul Wechsler, Morganville, NJ (US)

(72) Inventor: Paul Wechsler, Morganville, NJ (US)

( * ) Notice: Subject to any disclaimer, the term of this patent is extended or adjusted under 35 U.S.C. 154(b) by 0 days.

(21) Appl. No.: 16/372,619

(22) Filed: Apr. 2, 2019

(51) Int. Cl.
  *B60Q 1/26* (2006.01)
  *F21V 23/04* (2006.01)
  *F21V 21/22* (2006.01)
  *B60Q 1/32* (2006.01)

(52) U.S. Cl.
  CPC ......... *B60Q 1/2615* (2013.01); *B60Q 1/2657* (2013.01); *B60Q 1/32* (2013.01); *F21V 21/22* (2013.01); *F21V 23/04* (2013.01)

(58) Field of Classification Search
  None
  See application file for complete search history.

(56) References Cited

U.S. PATENT DOCUMENTS

| | | | |
|---|---|---|---|
| 3,439,326 A | 4/1969 | Boudin | |
| 5,450,058 A | 9/1995 | Collier | |
| 6,809,654 B2 | 10/2004 | Hudson | |
| 8,393,750 B2 | 3/2013 | Clement | |
| D705,682 S | 5/2014 | Stowers | |
| 2004/0206292 A1* | 10/2004 | Kim | B60Q 1/2665 116/39 |
| 2007/0146125 A1 | 6/2007 | Kim | |
| 2018/0197410 A1 | 7/2018 | Stafford | |

FOREIGN PATENT DOCUMENTS

WO 2005110811 11/2005

* cited by examiner

*Primary Examiner* — Ashok Patel

(57) ABSTRACT

The automotive hazard light system is a signaling system configured for use with a vehicle. The automotive hazard light system mounts on the inferior side of the vehicle. The automotive hazard light system automatically deploys by releasing itself from the vehicle, moving a distance away from the vehicle, and deploying a hazard signal. The automotive hazard light system subsequently retracts to a position underneath the vehicle. The automotive hazard light system comprises a cart, a control circuit, and a power circuit. The cart contains the control circuit and the power circuit. The cart moves the automotive hazard light system away from the vehicle and retracts the automotive hazard light system towards the vehicle. The control circuit controls the movement of the cart and the operation of the hazard signal. The power circuit provides the electrical energy required to operate the automotive hazard light system.

17 Claims, 7 Drawing Sheets

AUTOMOTIVE HAZARD LIGHT SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of transportation and vehicles including signaling and lighting devices, more specifically, a signal light for indicating a vehicle breakdown or emergency. (B60Q1/52)

SUMMARY OF INVENTION

The automotive hazard light system is a signaling system. The automotive hazard light system is configured for use with a vehicle. The automotive hazard light system mounts on the inferior side of the vehicle. The automotive hazard light system automatically deploys. The automotive hazard light system releases itself from the vehicle, moves a distance away from the vehicle and deploys a hazard signal indicating an abnormal operating condition in the vehicle. When the operation of the automotive hazard light system is no longer required, the automotive hazard light system retracts to a position underneath the vehicle. The automotive hazard light system comprises a cart, a control circuit, and a power circuit. The cart contains the control circuit and the power circuit. The cart moves the automotive hazard light system away from the vehicle and retracts the automotive hazard light system towards the vehicle. The control circuit controls the movement of the cart and the operation of the hazard signal. The power circuit provides the electrical energy required to operate the automotive hazard light system.

These together with additional objects, features and advantages of the automotive hazard light system will be readily apparent to those of ordinary skill in the art upon reading the following detailed description of the presently preferred, but nonetheless illustrative, embodiments when taken in conjunction with the accompanying drawings.

In this respect, before explaining the current embodiments of the automotive hazard light system in detail, it is to be understood that the automotive hazard light system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the automotive hazard light system.

It is therefore important that the claims be regarded as including such equivalent construction insofar as they do not depart from the spirit and scope of the automotive hazard light system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
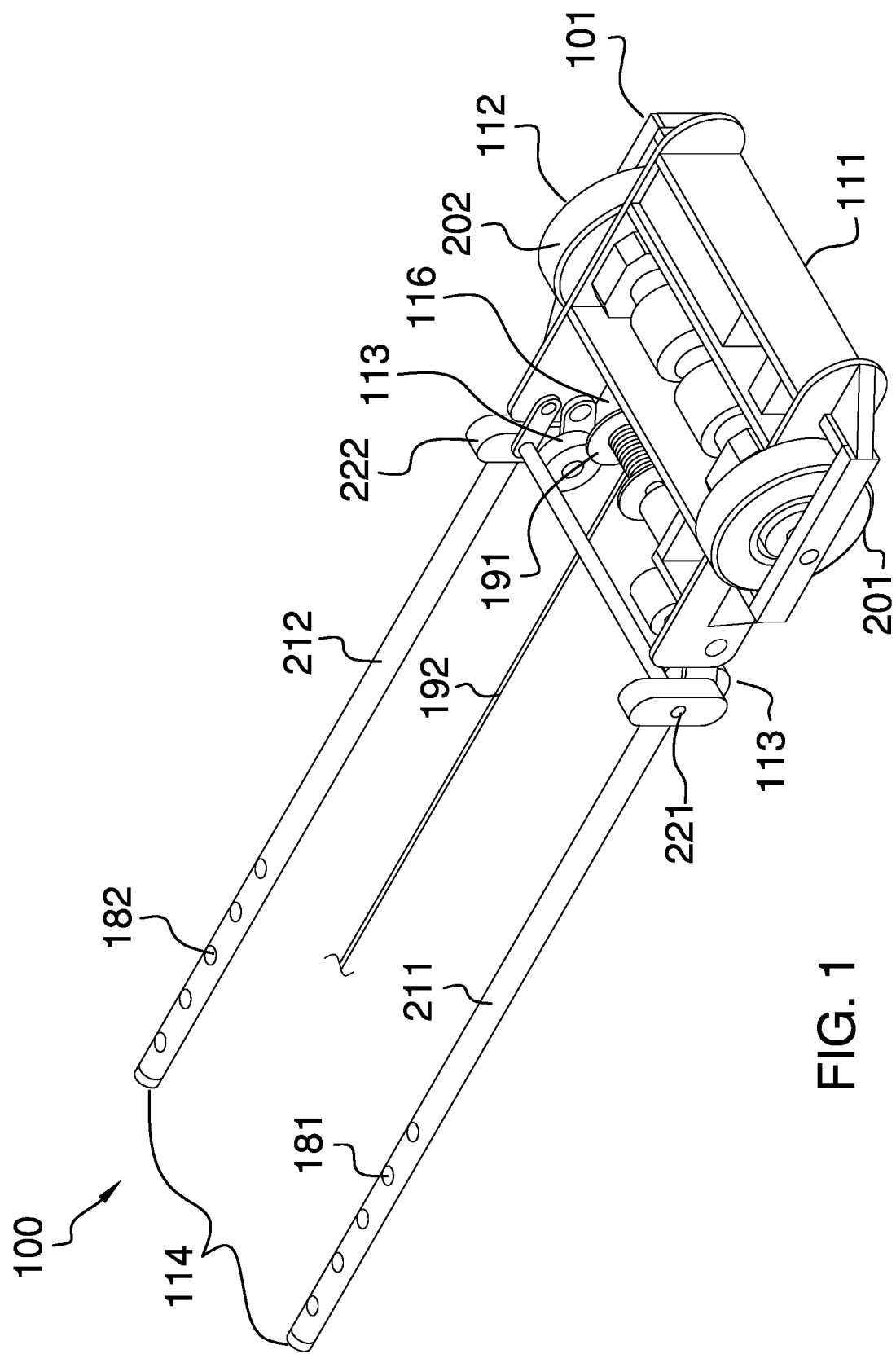
FIG. 1 is a perspective view of an embodiment of the disclosure.
Figure 2:
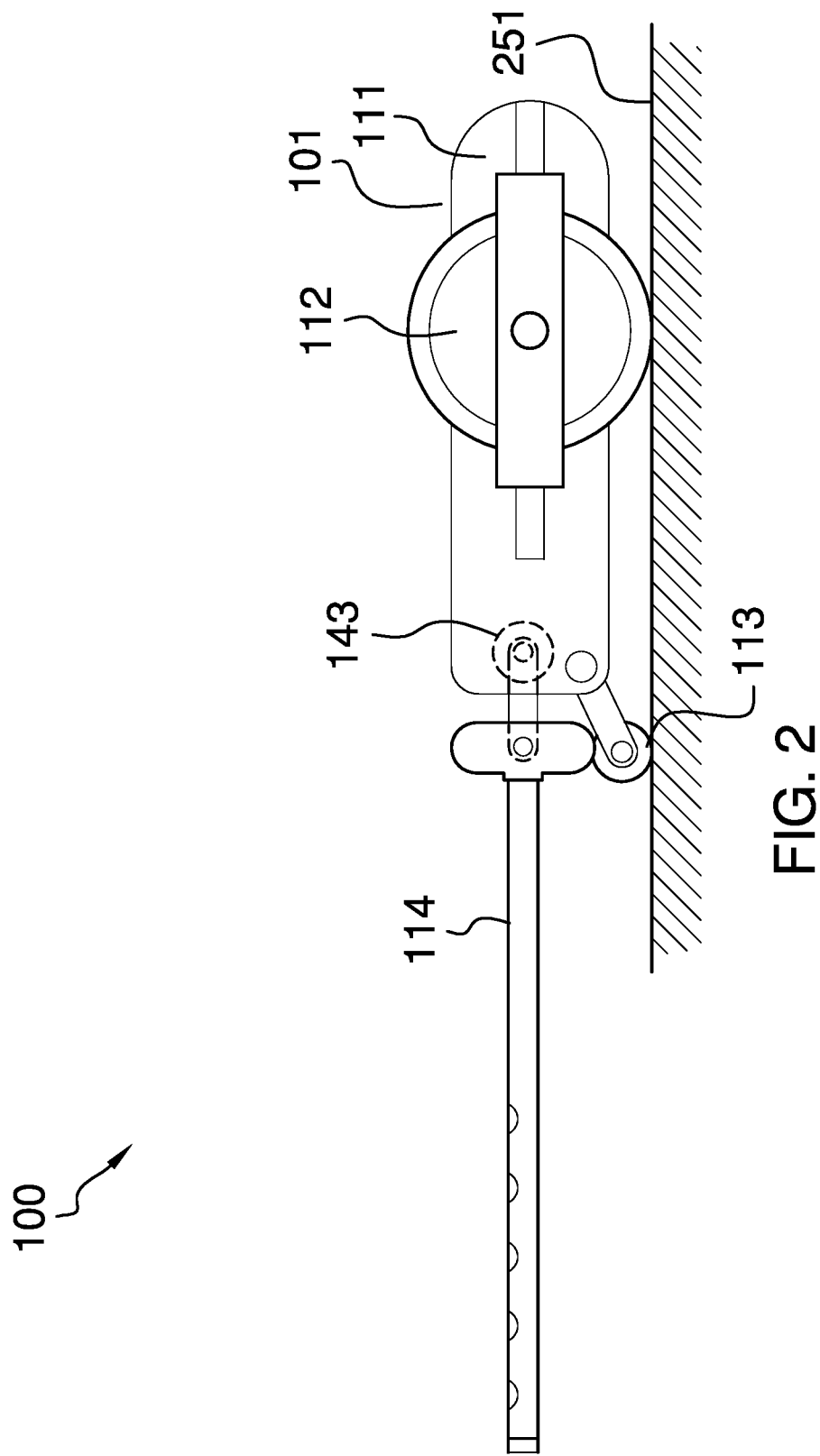
FIG. 2 is a side view of an embodiment of the disclosure.
Figure 3:
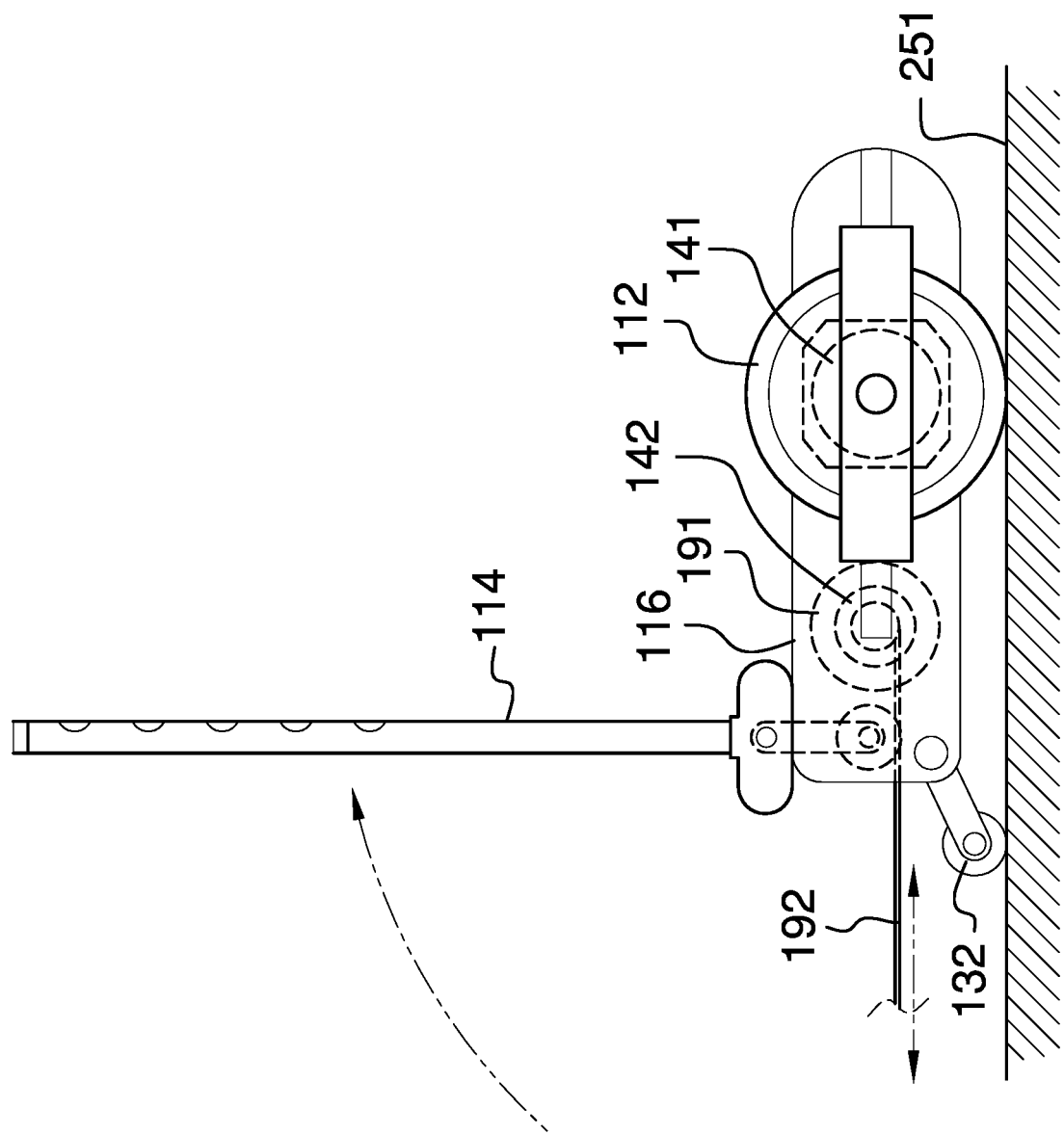
FIG. 3 is a side view of an embodiment of the disclosure.
Figure 4:
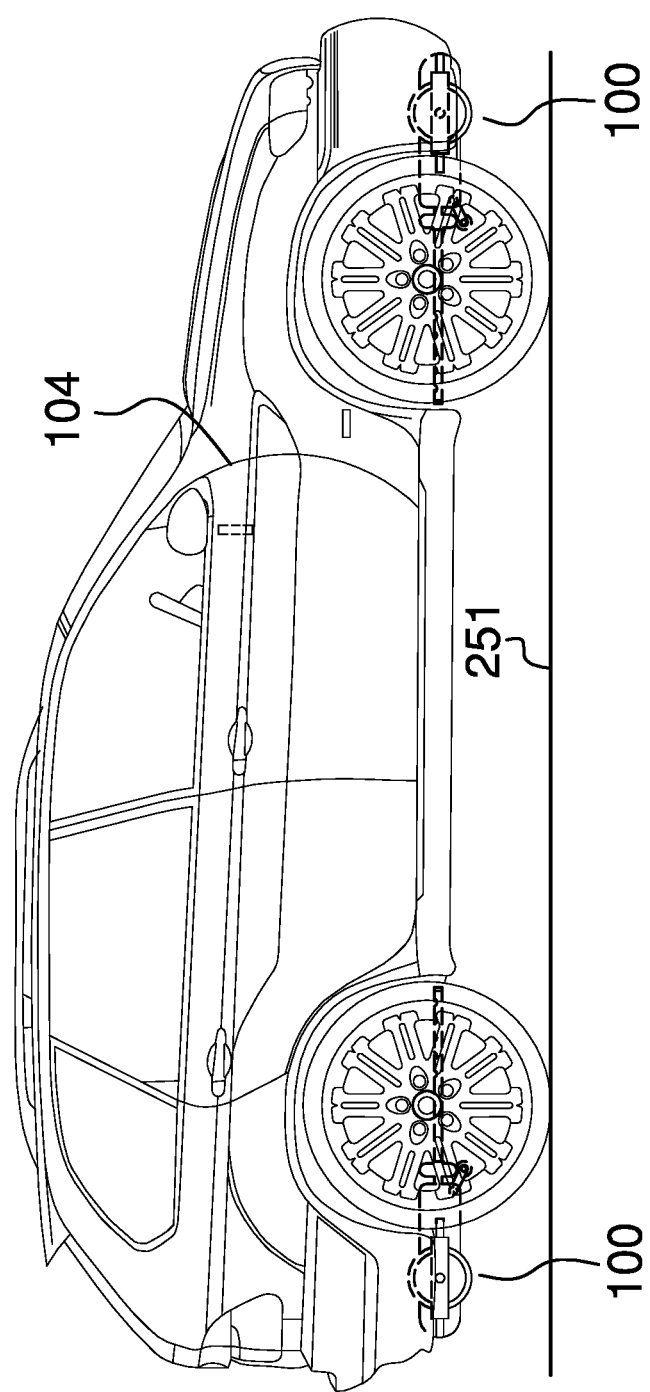
FIG. 4 is a detail view of an embodiment of the disclosure.
Figure 5:
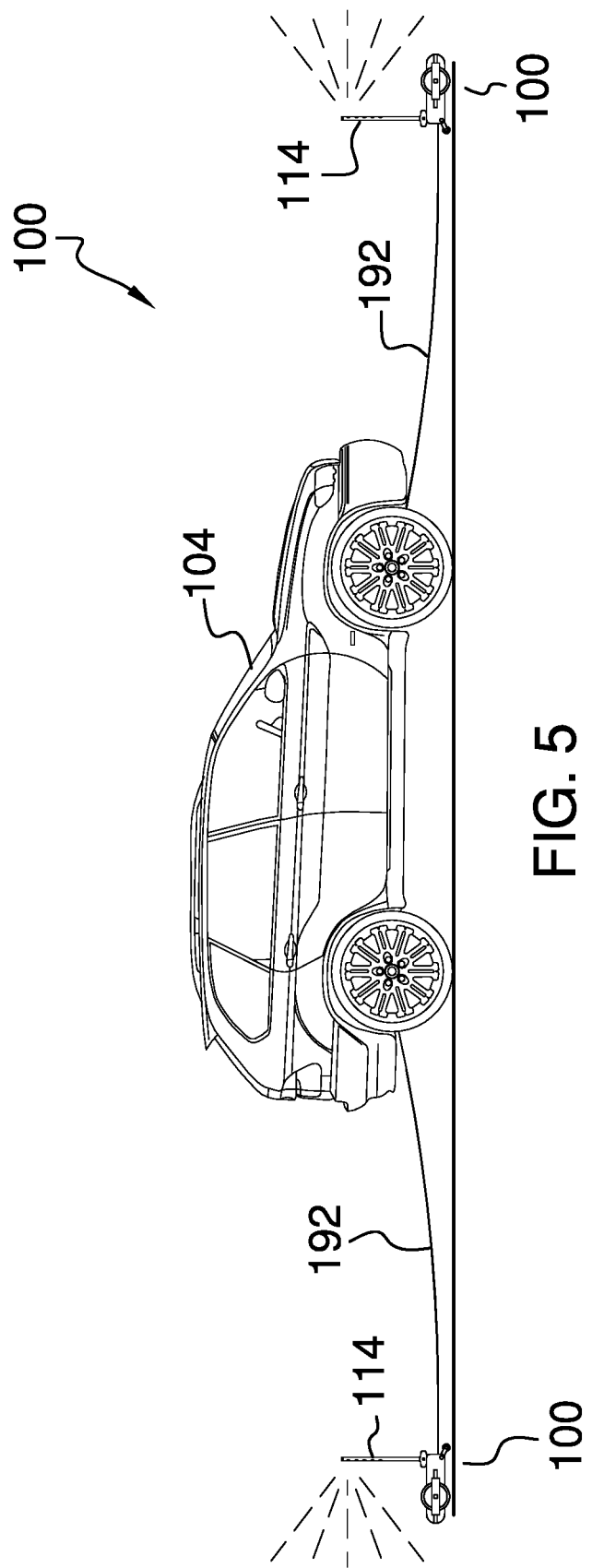
FIG. 5 is a detail view of an embodiment of the disclosure.
Figure 6:
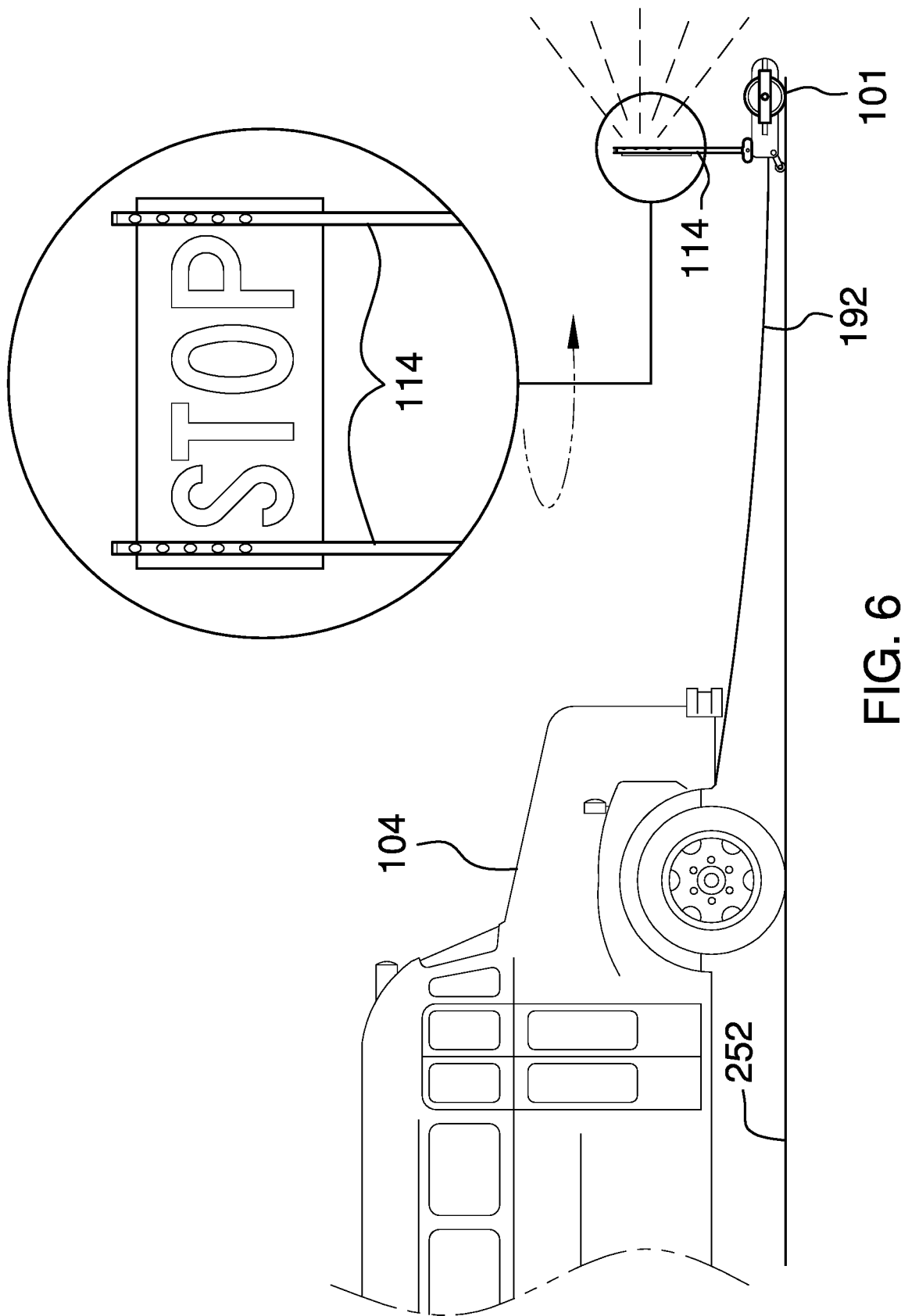
FIG. 6 is a detail view of an alternate embodiment of the disclosure.
Figure 7:
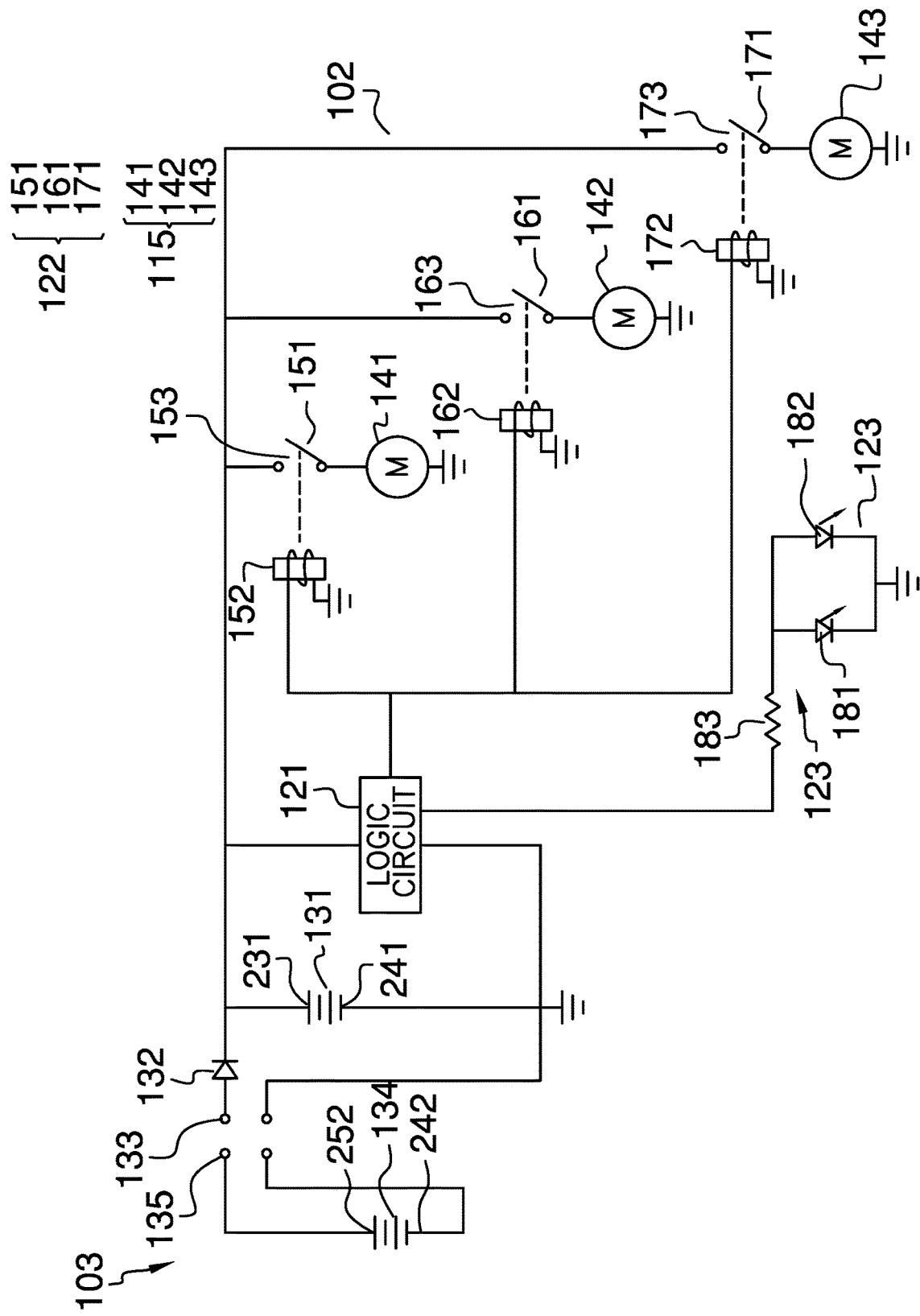
FIG. 7 is a block diagram of an embodiment of the disclosure.

Detailed reference will now be made to one or more potential embodiments of the disclosure, which are illustrated in FIGS. 1 through 7.

The automotive hazard light system 100 (hereinafter invention) is a signaling system. The invention 100 is configured for use with a vehicle 104. The invention 100 mounts on the inferior side of the vehicle 104. The invention 100 automatically deploys. The invention 100 releases itself from the vehicle 104, moves a distance away from the vehicle 104 and deploys a hazard signal indicating an abnormal operating condition in the vehicle 104. When the operation of the invention 100 is no longer required, the invention 100 retracts to a position underneath the vehicle 104. The invention 100 comprises a cart 101, a control circuit 102, and a power circuit 103. The cart 101 contains the control circuit 102 and the power circuit 103. The cart 101 moves the invention 100 away from the vehicle 104 and retracts the invention 100 towards the vehicle 104. The control circuit 102 controls the movement of the cart 101 and the operation of the hazard signal. The power circuit 103 provides the electrical energy required to operate the invention 100.

The vehicle 104 is a motorized vehicle 104 that is configured for use on a road network. The vehicle 104 is defined in greater detail elsewhere in this disclosure.

The cart 101 is a motorized mobile structure used to transport the control circuit 102 and the power circuit 103. The cart 101 transports the control circuit 102 and the power circuit 103 away from and toward the vehicle 104 during deployment and retraction respectively. The cart 101 is tethered to the vehicle 104. The cart 101 attaches to the inferior surface of the vehicle 104 for storage. The cart 101 comprises a frame 111, a plurality of drive wheels 112, one or more stabilizing wheels 113, a plurality of emergency stanchions 114, a plurality of motors 115, and a tether apparatus 116.

The frame 111 is a mechanical structure. The plurality of drive wheels 112, the one or more stabilizing wheels 113, the plurality of emergency stanchions 114, the plurality of motors 115, the tether apparatus 116, the control circuit 102, and the power circuit 103 attach to the frame 111.

Each of the plurality of drive wheels 112 is a wheel that attaches to the frame 111 such that the frame 111 can roll across the ground 251 on which the vehicle 104 operates. Each of the plurality of drive wheels 112 forms a portion of the load path between the frame 111 and the ground 251. The plurality of drive wheels 112 are driven by one or more motors selected from the plurality of motors 115. The plurality of drive wheels 112 transmits the motive forces required to move the frame 111 away from the vehicle 104 during deployment of the invention 100. The plurality of drive wheels 112 comprises a first drive wheel 201 and a second drive wheel 202.

The first drive wheel 201 is a wheel selected from the plurality of drive wheels 112 that attaches to the frame 111. The first drive wheel 201 is a driven wheel that transmits the motive forces generated by the one or more drive motors 141 into the motion that deploys the invention 100 for use. The second drive wheel 202 is a wheel selected from the plurality of drive wheels 112 that attaches to the frame 111. The second drive wheel 202 is a driven wheel that transmits the motive forces generated by the one or more drive motors 141 into the motion that deploys the invention 100 for use. The first drive wheel 201 and the second drive wheel 202 are identical.

Each of the one or more stabilizing wheels 113 is a wheel that attaches to the frame 111 such that the frame 111 can roll across the ground 251 on which the vehicle 104 operates. Each of the one or more stabilizing wheels 113 forms a portion of the load path between the frame 111 and the ground 251.

Each of the plurality of emergency stanchions 114 is a rotating shaft structure. Each of the plurality of emergency stanchions 114 rotates such that the center axis of the shaft structure that forms each of the plurality of emergency stanchions 114 defines a plane. The planes formed by the rotation of the center axis of each of the plurality of emergency stanchions 114 are parallel. Each of the plurality of emergency stanchions 114 vertically elevates the hazard indication generated such that the hazard indication is readily visible. Each of the plurality of emergency stanchions 114 rotates from a vertical position to a horizontal position such that the invention 100 fits for storage underneath the vehicle 104. The plurality of emergency stanchions 114 comprises a first emergency stanchion 211, a second emergency stanchion 212, a first ES hinge 221, and a second ES hinge 222.

The first emergency stanchion 211 is a shaft that attaches to the frame 111. The first emergency stanchion 211 is an extension structure that elevates the first LED bank 181 above the ground 251. The second emergency stanchion 212 is a shaft that attaches to the frame 111. The second emergency stanchion 212 is an extension structure that elevates the second LED bank 182 above the ground 251.

The first ES hinge 221 is a rotating structure that attaches the first emergency stanchion 211 to the frame 111. The one or more deployment motors 143 attach to the first ES hinge 221 such that the one or more deployment motors 143 will provide the motive forces required to rotate the first emergency stanchion 211 between the horizontal orientation and the vertical orientation. The second ES hinge 222 is a rotating structure that attaches the second emergency stanchion 212 to the frame 111. The one or more deployment motors 143 attach to the second ES hinge 222 such that the one or more deployment motors 143 will provide the motive forces required to rotate the second emergency stanchion 212 between the horizontal orientation and the vertical orientation.

Each of the plurality of motors 115 is an electrical motor. Each motor selected from the plurality of motors 115 performs a function selected from the group consisting of: a) driving the plurality of drive wheels 112 to deploy the invention 100; b) driving the operation of the tether apparatus 116 to retract the invention 100; and, c) rotating the plurality of emergency stanchions 114 between a vertical orientation and a horizontal orientation. The control circuit 102 controls the operation of each of the plurality of motors 115. The control circuit 102 draws power for the operation of each of the plurality of motors 115 from the power circuit 103. The plurality of motors 115 comprises one or more drive motors 141, a retraction motor 142, and one or more deployment motors 143.

Each of the one or more drive motors 141 is an electric motor. Each of the one or more drive motors 141 attaches to one or more wheels selected from the plurality of drive wheels 112 such that the one or more drive motors 141 rotate the plurality of drive wheels 112 during the deployment of the invention 100. The control circuit 102 controls the operation of the one or more drive motors 141 through a relay selected from the plurality of relays 122.

The retraction motor 142 is an electric motor. The retraction motor 142 attaches to the tether apparatus 116 such that the retraction motor 142 rotates the tether apparatus 116 during the retraction of the invention 100. The control circuit controls the operation of the retraction motor 142 through a relay selected from the plurality of relays 122.

Each of the one or more deployment motors 143 is an electric motor. Each of the one or more deployment motors 143 attaches to one or more emergency stanchions selected from the plurality of emergency stanchions 114 such that the one or more deployment motors 143 rotate the plurality of emergency stanchions 114 between the horizontal orientation and the vertical orientation. The control circuit 102 controls the operation of the one or more deployment motors 143 through a relay selected from the plurality of relays 122.

The tether apparatus 116 is a mechanical structure. The tether apparatus 116 tethers the frame 111 to the vehicle 104 through the deployment process. The control circuit 102 uses the tether apparatus 116 to pull the frame 111 back to the vehicle 104 during the retraction process. The tether apparatus 116 comprises tether spool 191 and a tether cable 192.

The tether spool 191 is a spool. The tether spool 191 stores the tether cable 192 when the invention 100 is retracted under the vehicle 104. The tether spool 191 pays out the tether cable 192 as the one or more drive motors 141 deploys the invention 100. The retraction motor 142 rotates the tether spool 191 such that the tether cable 192 is loaded onto the tether spool 191 as the invention 100 is retracted underneath the vehicle 104. The tension applied to the tether cable 192 provided by the rotation of the tether spool 191 by the retraction motor 142 provides the motive force required to pull the invention 100 underneath the vehicle 104 during the retraction process. The tether cable 192 is a cord that tethers the cart 101 to the vehicle 104. The tether cable 192 is a structure that has a tensile strength but does not resist compressive forces. In the first potential embodiment of the disclosure, the tether cable 192 is a wire cable.

The control circuit 102 is an electrical circuit. The control circuit 102 is a non-programmable device. The control circuit 102 controls the operation of the invention 100. The control circuit 102 controls the deployment and the retraction of the cart 101. The control circuit 102 controls the operation of the hazard indication generated by the invention 100. The control circuit 102 generates a series of rhythmic flashes of illumination as the hazard indication. The control circuit 102 comprises a logic circuit 121, a plurality of relays 122, and a plurality of emergency lights 123. The logic circuit 121, the plurality of relays 122, and the plurality of emergency lights are electrically connected.

The logic circuit 121 is an electrical circuit. The logic circuit 121 is a non-programmable circuit. The logic circuit controls the operation of the control circuit 102. The logic circuit 121 controls the operation of the plurality of relays 122 that operate the one or more motors selected from the plurality of motors 115 used to deploy the frame 111. The logic circuit 121 controls the operation of the plurality of relays that operate the one or more motors selected from the plurality of motors 115 used to retract the frame 111. The logic circuit 121 controls the operation of the plurality of relays 122 that operate the one or more motors selected from the plurality of motors 115 used to rotate the frame 111. The logic circuit 121 generates a series of rhythmic pulses that illuminate and extinguish the plurality of emergency lights 123 in a rhythmic pattern. Methods to design and fabricate the logic circuit 121 described above are well-known and documented in the electrical arts.

Each of the plurality of relays 122 is an electrical switching device. The logic circuit 121 controls the operation of each of the plurality of relays 122. Each of the plurality of relays 122 controls the flow of electric energy from the power circuit 103 into one or more motors selected from the plurality of motors 115. The plurality of relays 122 comprises a first relay 151, a second relay 161, and a third relay 171.

The first relay 151 is an electrically controlled switch. The logic circuit 121 controls the operation of the first relay 151. The first relay 151 controls the operation of the one or more drive motors 141 by controlling the flow of electricity from the battery 131 of the power circuit 103 into the one or more drive motors 141. The first relay 151 further comprises a first relay 151 coil 152 and a first relay 151 switch 153.

The first relay 151 coil 152 is a solenoid that controls the operation of the first relay 151 switch 153. The logic circuit 121 energizes and de-energizes the first relay 151 coil 152 in order to open and close the first relay 151 switch 153. The first relay 151 switch 153 is a normally open electrical switch. The first relay 151 switch 153 moves from the open to the closed position when the logic circuit 121 energizes the first relay 151 coil 152. The first relay 151 switch 153 moves from the closed to the open position when the logic circuit 121 de-energizes the first relay 151 coil 152. The first relay 151 switch 153 electrically connects between the battery 131 of the power circuit 103 and the one or more drive motors 141 such that the first relay 151 switch 153 physically controls the flow of electricity into the one or more drive motors 141.

The second relay 161 is an electrically controlled switch. The logic circuit 121 controls the operation of the second relay 161. The second relay 161 controls the operation of the retraction motor 142 by controlling the flow of electricity from the battery 131 of the power circuit 103 into the retraction motor 142. The second relay 161 further comprises a second relay 161 coil 162 and a second relay 161 switch 163.

The second relay 161 coil 162 is a solenoid that controls the operation of the second relay 161 switch 163. The logic circuit 121 energizes and de-energizes the second relay 161 coil 162 in order to open and close the second relay 161 switch 163. The second relay 161 switch 163 is a normally open electrical switch. The second relay 161 switch 163 moves from the open to the closed position when the logic circuit 121 energizes the second relay 161 coil 162. The second relay 161 switch 163 moves from the closed to the open position when the logic circuit 121 de-energizes the second relay 161 coil 162. The second relay 161 switch 163 electrically connects between the battery 131 of the power circuit 103 and the retraction motor such that the second relay 161 switch 163 physically controls the flow of electricity into the retraction motor 142.

The third relay 171 is an electrically controlled switch. The logic circuit 121 controls the operation of the third relay 171. The third relay 171 controls the operation of the one or more deployment motors 143 by controlling the flow of electricity from the battery 131 of the power circuit 103 into the one or more deployment motors 143. The third relay 171 further comprises a third relay 171 coil 172 and a third relay 171 switch 173.

The third relay 171 coil 172 is a solenoid that controls the operation of the third relay 171 switch 173. The logic circuit 121 energizes and de-energizes the third relay 171 coil 172 in order to open and close the third relay 171 switch 173. The third relay 171 switch 173 is a normally open electrical switch. The third relay 171 switch 173 moves from the open to the closed position when the logic circuit 121 energizes the third relay 171 coil 172. The third relay 171 switch 173 moves from the closed to the open position when the logic circuit 121 de-energizes the third relay 171 coil 172. The third relay 171 switch 173 electrically connects between the battery 131 of the power circuit 103 and the one or more deployment motors 143 such that the third relay 171 switch 173 physically controls the flow of electricity into the one or more deployment motors 143.

Each of the plurality of emergency lights 123 is a lamp. Each of the plurality of emergency lights 123 generates a rhythmically flashing illumination that creates the hazard indication generated by the invention 100. The logic circuit 121 of the control circuit 102 controls the operation of each of the plurality of emergency lights 123. The power circuit 103 provides the electrical power required to operate the plurality of emergency lights 123. Each of the plurality of emergency lights 123 mount on an emergency stanchion selected from the plurality of emergency stanchions 114. The plurality of emergency lights 123 further comprises a first LED bank 181, a second LED bank 182, and a limit resistor 183.

The first LED bank 181 comprises a plurality of LEDS used to generate a portion of the illumination generated by the control circuit 102 to form the hazard indication. The first LED bank 181 mount on the first emergency stanchion 211 selected from the plurality of emergency stanchions 114 of the cart 101. The logic circuit 121 controls the operation of the first LED bank 181. The second LED bank 182 comprises a plurality of LEDS used to generate a portion of the illumination generated by the control circuit 102 to form the hazard indication. The second LED bank 182 mount on the second emergency stanchion 212 selected from the plurality of emergency stanchions 114 of the cart 101. The logic circuit 121 controls the operation of the second LED bank 182.

The limit resistor 183 is an electric circuit element. The limit resistor 183 electrically connects in a series circuit with the logic circuit 121 and the first LED bank 181. The limit resistor 183 electrically connects in a series circuit with the logic circuit 121 and the second LED bank 182. The limit resistor 183 limits the flow of electricity through the first LED bank 181. The limit resistor 183 limits the flow of electricity through the second LED bank 182.

The power circuit 103 is an electrochemical device. The power circuit 103 converts chemical potential energy into electrical energy that is used to power the operation of the control circuit 102. The power circuit 103 comprises a battery 131, a diode 132, a charging port 133, and an external power source 134. The external power source 134 further comprises a charging plug 135. The battery 131 is further defined with a first positive terminal 231 and a first negative terminal 241. The external power source 134 is further defined with a second positive terminal 232 and a second negative terminal 242.

The battery 131 is a commercially available rechargeable battery 131. The chemical energy stored within the rechargeable battery 131 is renewed and restored through the use of the charging port 133. The charging port 133 is an electrical circuit that reverses the polarity of the rechargeable battery and provides the energy necessary to reverse the chemical processes that the rechargeable battery 131 initially used to generate the electrical energy. This reversal of the chemical process creates a chemical potential energy that will later be used by the rechargeable battery 131 to generate electricity.

The charging port 133 forms an electrical connection to an external power source 134 using the charging plug 135. The charging plug 135 forms a detachable electrical connection with the charging port 133. The charging port 133 receives electrical energy from the external power source 134 through the charging plug 135. The diode 132 is an electrical device that allows current to flow in only one direction. The diode 132 installs between the rechargeable battery 131 and the charging port 133 such that electricity will not flow from the first positive terminal 231 of the rechargeable battery 131 into the second positive terminal 232 of the external power source 134.

In the first potential embodiment of the disclosure, the external power source 134 is the electrical power system of the vehicle 104.

The following definitions were used in this disclosure:

Battery: As used in this disclosure, a battery is a chemical device consisting of one or more cells, in which chemical energy is converted into electricity and used as a source of power. Batteries are commonly defined with a positive terminal and a negative terminal.

Cable: As used in this disclosure, a cable is a cord formed from braided metal wires.

Coil: As used in this disclosure, a coil is a structure that has the shape of a helix, volute, or a spiral. The structure of the coil is often a cord, wire, hose, or tube.

Cord: As used in this disclosure, a cord is a long, thin, flexible, and prism-shaped string, line, rope, or wire. Cords are made from yarns, piles, or strands of material that are braided or twisted together or from a monofilament (such as fishing line). Cords have tensile strength but are too flexible to provide compressive strength and are not suitable for use in pushing objects. String, line, cable, and rope are synonyms for cord.

Diode: As used in this disclosure, a diode is a two terminal semiconductor device that allows current flow in only one direction. The two terminals are called the anode and the cathode. Electric current is allowed to pass from the anode to the cathode.

Electric Motor: In this disclosure, an electric motor is a machine that converts electric energy into rotational mechanical energy. An electric motor typically comprises a stator and a rotor. The stator is a stationary hollow cylindrical structure that forms a magnetic field. The rotor is a magnetically active rotating cylindrical structure that is coaxially mounted in the stator. The magnetic interactions between the rotor and the stator physically causes the rotor to rotate within the stator thereby generating rotational mechanical energy. This disclosure assumes that the power source is an externally provided source of DC electrical power. The use of DC power is not critical and AC power can be used by exchanging the DC electric motor with an AC motor that has a reversible starter winding.

Extension Structure: As used in this disclosure, an extension structure is an inert physical structure that is used to extend or bridge the reach between any two objects.

External Power Source: As used in this disclosure, an external power source is a source of the energy that is externally provided to enable the operation of the present disclosure. Examples of external power sources include, but are not limited to, electrical power sources and compressed air sources.

Force of Gravity: As used in this disclosure, the force of gravity refers to a vector that indicates the direction of the pull of gravity on an object at or near the surface of the earth.

Frame: As used in this disclosure, a frame is a structure: a) to which an object attaches; and, b) which forms a portion of the load path of the object.

Ground: As used in this disclosure, the ground is a solid supporting surface formed by the Earth. The term level ground means that the supporting surface formed by the ground is roughly perpendicular to the force of gravity.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Inferior: As used in this disclosure, the term inferior refers to a directional reference that is parallel to and in the same direction as the force of gravity when an object is positioned or used normally.

Lamp: As used in this disclosure, a lamp is a two-terminal electrical device that generates (typically visible spectrum) electromagnetic radiation.

LED: As used in this disclosure, an LED is an acronym for a light emitting diode. A light emitting diode is a diode that is also a light source. Because of close operational correspondence of the function of the cathode and anode of an organic LED and the cathode and anode of a semiconductor LED, organic LEDs are included in this definition.

Limit Resistor: As used in this disclosure, a limit resistor is an electrical resistor that is used to limit the flow of electric current through an electrical circuit.

Logic Circuit: As used in this disclosure, a logic circuit is non-programmable electrical device that receives one or more digital or analog inputs and uses those digital or analog inputs to generate one or more digital or analog outputs.

Motor: As used in this disclosure, a motor refers to the method of transferring energy from an external power source into rotational mechanical energy.

Motor Controller: As used in this disclosure, a motor controller is an electrical device that is used to control the rotational speed, or simply the speed of the motor, and the direction of rotation of an electric motor. Motor controllers will generally receive one or more inputs which are used determine the desired rotational speed and direction of rotation of the electric motor.

Normally Closed: As used in this disclosure, normally closed refers to an externally controlled electrical switching device, such as a relay or a momentary switch, which passes electric current when the externally controlled electrical switching device is in an unpowered state.

Normally Open: As used in this disclosure, normally open refers to an externally controlled electrical switching device, such as a relay or a momentary switch, which does not pass electric current when the externally controlled electrical switching device is in an unpowered state.

Orientation: As used in this disclosure, orientation refers to the positioning of a first object relative to: 1) a second object; or, 2) a fixed position, location, or direction.

Plug: As used in this disclosure, a plug is an electrical termination that electrically connects a first electrical circuit to a second electrical circuit or a source of electricity. As used in this disclosure, a plug will have two or three metal pins.

Port: As used in this disclosure, a port is an electrical termination that is used to connect a first electrical circuit to a second external electrical circuit. In this disclosure, the port is designed to receive a plug.

Pulse: As used in this disclosure, a pulse is a rhythmic signal or stimulus wherein the signal or stimulus has a brief duration.

Relay: As used in this disclosure, a relay is an automatic electromagnetic or electromechanical device that reacts to changes in voltage or current by opening or closing a switch in an electric circuit. Relays further defined with a coil and a switch. Applying a voltage to the coil, usually referred to as energizing the coil, will cause the coil to change the position of the switch. Note: Though transistors can be configured to perform switching functions, transistors used for switching functions are handled separately in this disclosure and are explicitly excluded from this definition.

Resistor: As used in this disclosure, a resistor is a well-known and commonly available electrical device that inhibits the flow of electricity through an electric circuit. Within an electric circuit processing alternating currents, the resistor will not affect the phase of the alternating current. A current flowing through a resistor will create a voltage across the terminals of the resistor.

Rhythm: As used in this disclosure, rhythm refers to a pattern that repeats at regular intervals.

Solenoid: As used in this disclosure, a solenoid is a cylindrical coil of electrical wire that generates a magnetic field that can be used to mechanically move a shaft made of a magnetic core.

Spool: As used in this disclosure, a spool is a cylindrical device upon which a flexible material, including but not limited to a yarn, a cord, or a tape, can be wound. Depending on context, a spool may also contain the flexible material stored upon the spool.

Superior: As used in this disclosure, the term superior refers to a directional reference that is parallel to and in the opposite direction of the force of gravity when an object is positioned or used normally.

Supporting Surface: As used in this disclosure, a supporting surface is a horizontal surface upon which an object is placed and to which the load path of the object is transferred. This disclosure assumes that an object placed on the supporting surface is in an orientation that is appropriate for the normal or anticipated use of the object.

Tether: As used in this disclosure, a tether is a cord, line, webbing, or strap that is attached to an object to restrict its movement.

Timing Circuit: As used in this disclosure, a timing circuit refers to an electrical network of interconnected electrical elements, potentially including but not limited to, resistors, capacitors, diodes, transistors, and integrated circuit devices. The purpose of the timing circuit is to generate an electrical control signal after a predetermined amount of time. In common usage, a timing circuit is also referred to as timing circuitry. The "555" timing circuit is a well-known, documented, and commercially available timing circuit.

Timing Device: As used in this disclosure, a timing device is an automatic mechanism for activating or deactivating a device at a specific time or after a specific period of time. This disclosure assumes that the logic module is provisioned with a timing circuit that can be used as a timing device. A timing device that activates an audible alarm is often referred to as a timer.

Vehicle: As used in this disclosure, a vehicle is a motorized device used for transporting passengers, goods, or equipment. The term motorized vehicle refers to a vehicle can move under power provided by an electric motor or an internal combustion engine.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

Wheel: As used in this disclosure, a wheel is a circular object that revolves around an axle or an axis and is fixed below an object to enable it to move easily over the ground. For the purpose of this disclosure, it is assumed that a wheel can only revolve in a forward and a backward direction. Wheels are often further defined with a rim and spokes. Spokes are also commonly referred to as a wheel disk.

With respect to the above description, it is to be realized that the optimum dimensional relationship for the various components of the invention described above and in FIGS. 1 through 7 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A signaling device comprising:
a cart, a control circuit, and a power circuit;
wherein the cart contains the control circuit and the power circuit;
wherein the signaling device is configured for use with a vehicle;
wherein the signaling device mounts on an inferior side of the vehicle;
wherein the signaling device releases itself from the vehicle, moves a distance away from the vehicle and deploys a hazard indication;
wherein the signaling device retracts to a position underneath the vehicle;
wherein the cart moves the signaling device away from the vehicle and retracts the signaling device towards the vehicle;
wherein the control circuit controls a movement of the cart and the operation of the hazard indication;
wherein the power circuit provides the electrical energy required to operate the signaling device;
wherein the cart is a motorized mobile structure used to transport the control circuit and the power circuit;
wherein the cart transports the control circuit and the power circuit away from and toward the vehicle during deployment and retraction respectively;
wherein the cart is tethered to the vehicle;
wherein the cart attaches to an inferior surface of the vehicle for storage;
wherein the control circuit is an electrical circuit;
wherein the control circuit controls the operation of the signaling device;
wherein the control circuit controls a deployment and the retraction of the cart;
wherein the control circuit controls the operation of the hazard indication generated by the signaling device;
wherein the control circuit generates a series of rhythmic flashes of illumination as the hazard indication.

2. The signaling device according to claim 1
wherein the power circuit is an electrochemical device;
wherein the power circuit converts chemical potential energy into electrical energy that is used to power the operation of the control circuit.

3. The signaling device according to claim 2
wherein the cart comprises a frame, a plurality of drive wheels, one or more stabilizing wheels, a plurality of emergency stanchions, a plurality of motors, and a tether apparatus;
wherein the frame is a mechanical structure;
wherein the plurality of drive wheels, the one or more stabilizing wheels, the plurality of emergency stanchions, the plurality of motors, the tether apparatus, the control circuit, and the power circuit attach to the frame.

4. The signaling device according to claim 3
wherein each of the plurality of drive wheels is a wheel that attaches to the frame such that the frame can roll across the ground on which the vehicle operates;
wherein each of the plurality of drive wheels forms a portion of a load path between the frame and the ground;
wherein the plurality of drive wheels are driven by one or more motors selected from the plurality of motors;
wherein the plurality of drive wheels transmits the motive forces required to move the frame away from the vehicle during deployment of the signaling device.

5. The signaling device according to claim 4
wherein each of the one or more stabilizing wheels is a wheel that attaches to the frame such that the frame can roll across the ground on which the vehicle operates;
wherein each of the one or more stabilizing wheels forms a portion of the load path between the frame and the ground.

6. The signaling device according to claim 5
wherein each of the plurality of emergency stanchions is a rotating shaft structure;
wherein each of the plurality of emergency stanchions rotates such that the center axis of the shaft structure that forms each of the plurality of emergency stanchions defines a plane;
wherein the planes formed by the rotation of the center axis of each of the plurality of emergency stanchions are parallel;
wherein each of the plurality of emergency stanchions vertically elevates the hazard indication;
wherein each of the plurality of emergency stanchions rotates from a vertical position to a horizontal position such that the signaling device fits for storage underneath the vehicle.

7. The signaling device according to claim 6
wherein each of the plurality of motors is an electrical motor;
wherein each motor selected from the plurality of motors performs a function selected from the group consisting of: a) driving the plurality of drive wheels to deploy the signaling device; b) driving the operation of the tether apparatus to retract the signaling device; and, c) rotating the plurality of emergency stanchions between a vertical orientation and a horizontal orientation;
wherein the control circuit controls the operation of each of the plurality of motors.

8. The signaling device according to claim 7
wherein the plurality of motors comprises one or more drive motors, a retraction motor, and one or more deployment motors;
wherein each of the one or more drive motors is an electric motor;
wherein each of the one or more drive motors attaches to one or more wheels selected from the plurality of drive wheels such that the one or more drive motors rotate the plurality of drive wheels during the deployment of the signaling device;
wherein the retraction motor is an electric motor;
wherein the retraction motor attaches to the tether apparatus such that the retraction motor rotates the tether apparatus during the retraction of the signaling device;
wherein each of the one or more deployment motors is an electric motor;
wherein each of the one or more deployment motors attaches to one or more emergency stanchions selected from the plurality of emergency stanchions such that the one or more deployment motors rotate the plurality of emergency stanchions between the horizontal orientation and the vertical orientation;
wherein the control circuit controls the operation of the one or more drive motors;
wherein the control circuit controls the operation of the retraction motor;
wherein the control circuit controls the operation of the one or more deployment motors.

9. The signaling device according to claim 8
wherein the tether apparatus is a mechanical structure;
wherein the tether apparatus tethers the frame to the vehicle through the deployment process;
wherein the control circuit uses the tether apparatus to pull the frame back to the vehicle during the retraction process;
wherein the tether apparatus comprises tether spool and a tether cable;
wherein the tether spool is a spool;
wherein the tether spool stores the tether cable when the signaling device is retracted under the vehicle;
wherein the tether spool pays out the tether cable as the one or more drive motors deploys the signaling device;
wherein the retraction motor rotates the tether spool such that the tether cable is loaded onto the tether spool as the signaling device is retracted underneath the vehicle;
wherein the tension applied to the tether cable provided by the rotation of the tether spool by the retraction motor provides the motive force required to pull the signaling device underneath the vehicle during the retraction process;
wherein the tether cable is a cord that tethers the cart to the vehicle.

10. The signaling device according to claim 9
wherein the control circuit comprises a logic circuit, a plurality of relays, and a plurality of emergency lights;
wherein the logic circuit, the plurality of relays, and the plurality of emergency lights are electrically interconnected.

11. The signaling device according to claim 10
wherein the logic circuit is an electrical circuit;
wherein the logic circuit controls the operation of the control circuit;
wherein the logic circuit controls the operation of the plurality of relays that operate the one or more motors selected from the plurality of motors used to deploy the frame;
wherein the logic circuit controls the operation of the plurality of relays that operate the one or more motors selected from the plurality of motors used to retract the frame;
wherein the logic circuit controls the operation of the plurality of relays that operate the one or more motors selected from the plurality of motors used to rotate the frame;
wherein the logic circuit generates a series of rhythmic pulses that illuminate and extinguish the plurality of emergency lights in a rhythmic pattern.

12. The signaling device according to claim 11
wherein the plurality of relays comprises a first relay, a second relay, and a third relay;
wherein the first relay is an electrically controlled switch;
wherein the second relay is an electrically controlled switch;
wherein the third relay is an electrically controlled switch;
wherein the logic circuit controls the operation of the first relay;
wherein the logic circuit controls the operation of the second relay;
wherein the logic circuit controls the operation of the third relay;
wherein the first relay controls the operation of the one or more drive motors by controlling the flow of electricity from the battery of the power circuit into the one or more drive motors;
wherein the second relay controls the operation of the retraction motor by controlling the flow of electricity from the battery of the power circuit into the retraction motor;
wherein the third relay controls the operation of the one or more deployment motors by controlling the flow of electricity from the battery of the power circuit into the one or more deployment motors.

13. The signaling device according to claim 12
wherein the first relay further comprises a first relay coil and a first relay switch;
wherein the first relay coil is a solenoid that controls the operation of the first relay switch;
wherein the logic circuit energizes and de-energizes the first relay coil in order to open and close the first relay switch;
wherein the first relay switch is a normally open electrical switch;
wherein the first relay switch moves from the open to the closed position when the logic circuit energizes the first relay coil;
wherein the first relay switch moves from the closed to the open position when the logic circuit de-energizes the first relay coil;
wherein the first relay switch electrically connects between the battery of the power circuit and the one or more drive motors such that the first relay switch physically controls the flow of electricity into the one or more drive motors;
wherein the second relay further comprises a second relay coil and a second relay switch;
wherein the second relay coil is a solenoid that controls the operation of the second relay switch;
wherein the logic circuit energizes and de-energizes the second relay coil in order to open and close the second relay switch;
wherein the second relay switch is a normally open electrical switch;
wherein the second relay switch moves from the open to the closed position when the logic circuit energizes the second relay coil;
wherein the second relay switch moves from the closed to the open position when the logic circuit de-energizes the second relay coil;
wherein the second relay switch electrically connects between the battery of the power circuit and the retraction motor such that the second relay switch physically controls the flow of electricity into the retraction motor;
wherein the third relay further comprises a third relay coil and a third relay switch;
wherein the third relay coil is a solenoid that controls the operation of the third relay switch;
wherein the logic circuit energizes and de-energizes the third relay coil in order to open and close the third relay switch;
wherein the third relay switch is a normally open electrical switch;
wherein the third relay switch moves from the open to the closed position when the logic circuit energizes the third relay coil;
wherein the third relay switch moves from the closed to the open position when the logic circuit de-energizes the third relay coil;
wherein the third relay switch electrically connects between the battery of the power circuit and the one or more deployment motors such that the third relay switch physically controls the flow of electricity into the one or more deployment motors.

14. The signaling device according to claim 13
wherein each of the plurality of emergency lights is a lamp;
wherein each of the plurality of emergency lights generates a rhythmically flashing illumination that creates the hazard indication generated by the signaling device;
wherein the logic circuit of the control circuit controls the operation of each of the plurality of emergency lights;
wherein the power circuit provides the electrical power required to operate the plurality of emergency lights;
wherein each of the plurality of emergency lights mount on an emergency stanchion selected from the plurality of emergency stanchions.

15. The signaling device according to claim 14
wherein the plurality of emergency lights further comprises a first LED bank, a second LED bank, and a limit resistor;
wherein the first LED bank comprises a plurality of LEDs used to generate a portion of the illumination generated by the control circuit to form the hazard indication;
wherein the first LED bank mount on a first emergency stanchion selected from the plurality of emergency stanchions of the cart;
wherein the logic circuit controls the operation of the first LED bank;
wherein the second LED bank comprises a plurality of LEDs used to generate a portion of the illumination generated by the control circuit to form the hazard indication;
wherein the second LED bank mount on a second emergency stanchion selected from the plurality of emergency stanchions of the cart;
wherein the logic circuit controls the operation of the second LED bank;
wherein the limit resistor is an electric circuit element;
wherein the limit resistor electrically connects in a series circuit with the logic circuit and the first LED bank;
wherein the limit resistor electrically connects in a series circuit with the logic circuit and the second LED bank;
wherein the limit resistor limits the flow of electricity through the first LED bank;
wherein the limit resistor limits the flow of electricity through the second LED bank.

16. The signaling device according to claim 15
wherein the power circuit comprises a battery, a diode, a charging port, and an external power source;
wherein the external power source further comprises a charging plug;
wherein the battery is further defined with a first positive terminal and a first negative terminal;
wherein the external power source is further defined with a second positive terminal and a second negative terminal;
wherein the battery is a rechargeable battery;
wherein the charging port is an electrical circuit that reverses the polarity of the rechargeable battery;
wherein the charging port forms an electrical connection to the external power source using the charging plug;
wherein the charging plug forms a detachable electrical connection with the charging port;
wherein the charging port receives electrical energy from the external power source through the charging plug;
wherein the diode is an electrical device that allows current to flow in only one direction;
wherein the diode installs between the rechargeable battery and the charging port such that electricity will not flow from the first positive terminal of the rechargeable battery into the second positive terminal of the external power source.

17. The signaling device according to claim 16
wherein the plurality of drive wheels comprises a first drive wheel and a second drive wheel;
wherein the first drive wheel is a wheel selected from the plurality of drive wheels that attaches to the frame;
wherein the first drive wheel is a driven wheel that transmits the motive forces generated by the one or more drive motors into the motion that deploys the signaling device for use;
wherein the second drive wheel is a wheel selected from the plurality of drive wheels that attaches to the frame;
wherein the second drive wheel is a driven wheel that transmits the motive forces generated by the one or more drive motors into the motion that deploys the signaling device for use;
wherein the first drive wheel and the second drive wheel are identical;
wherein the plurality of emergency stanchions comprises a first emergency stanchion, a second emergency stanchion, a first ES hinge, and a second ES hinge;
wherein the first emergency stanchion is a shaft that attaches to the frame;
wherein the first emergency stanchion is an extension structure that elevates the first LED bank above the ground;
wherein the second emergency stanchion is a shaft that attaches to the frame;
wherein the second emergency stanchion is an extension structure that elevates the second LED bank above the ground;
wherein the first ES hinge is a rotating structure that attaches the first emergency stanchion to the frame;
wherein the second ES hinge is a rotating structure that attaches the second emergency stanchion to the frame;
wherein the one or more deployment motors attach to the first ES hinge such that the one or more deployment motors will provide the motive forces required to rotate the first emergency stanchion between the horizontal orientation and the vertical orientation;
wherein the one or more deployment motors attach to the second ES hinge such that the one or more deployment motors will provide the motive forces required to rotate the second emergency stanchion between the horizontal orientation and the vertical orientation;
wherein an external power source is the electrical power system of the vehicle.

* * * * *